United States Patent [19]

Koizumi et al.

[11] Patent Number: 4,483,880
[45] Date of Patent: Nov. 20, 1984

[54] EMULSIFIER COMPOSITION AND QUALITY IMPROVEMENT METHOD OF STARCH CONTAINING FOODS

[75] Inventors: Yoshihito Koizumi; Kenichi Yamada; Hiroshi Sakka; Mitsuharu Yuuda, all of Hirakata; Takeshi Yamaguchi, Chiba, all of Japan

[73] Assignee: Riken Vitamin Co. Ltd., Tokyo, Japan

[21] Appl. No.: 451,772

[22] Filed: Dec. 21, 1982

[30] Foreign Application Priority Data

Mar. 16, 1982 [JP] Japan ................................. 57-41581

[51] Int. Cl.$^3$ ........................... A21D 2/16; A23L 1/10
[52] U.S. Cl. ..................................... 426/549; 426/556; 426/558; 426/653; 426/654; 426/661
[58] Field of Search ............... 426/653, 549, 654, 556, 426/554, 558, 661; 252/356

[56] References Cited

U.S. PATENT DOCUMENTS

| | | | |
|---|---|---|---|
| 3,443,965 | 5/1969 | Birnbaum | 426/654 |
| 4,229,488 | 10/1980 | Suggs et al. | 426/653 X |
| 4,315,041 | 2/1982 | Fukuda et al. | 426/654 X |
| 4,363,826 | 12/1982 | Fukuda et al. | 426/653 |

FOREIGN PATENT DOCUMENTS 44-26900 11/1969 Japan .
50-34613 11/1975 Japan .

OTHER PUBLICATIONS

"Conjoined Crystals. I. Composition and Physical Properties", Journal of the American Oil Chemists' Society, vol. 40 (1963).

*Primary Examiner*—Robert Yoncoskie
*Attorney, Agent, or Firm*—Armstrong, Nikaido, Marmelstein & Kubovcik

[57] ABSTRACT

An emulsifier composition for use in starch containing foods which is prepared by melt-mixing a composition consisting of 65 to 90 wt % of saturated fatty acid monoglyceride and 35 to 10 wt % of cis-type unsaturated fatty acid monoglyceride, said composition having an iodine value of 10 to 40, with less than 10 wt % of one or more monoglycerides selected from diacetyltartaric acid esters of monoglyceride, mixed tartaric and acetic acid esters of monoglyceride, tartaric acid esters of monoglyceride and citric acid esters of monoglyceride, and powdering the resultant mixture.

3 Claims, No Drawings

EMULSIFIER COMPOSITION AND QUALITY IMPROVEMENT METHOD OF STARCH CONTAINING FOODS

BACKGROUND OF THE INVENTION

This invention relates to a novel emulsifier composition which exerts excellent improvement effects to starch containing food.

Due to its function and safety, mono- and diglyceride is widely used as emulsifier in the present food processing industry, and this function differs depending on the purity, appearance, physical and chemical properties, and the types of fatty acid that constitute the emulsifier.

In the case of starch containing food, such emulsifiers are required to react well, particularly with starch, to obtain a complex with the starch. Saturated fatty acid monoglyceride having 14 to 18 carbon atoms and of a high purity distilled monoglyceride is known to meet this requirement.

In the case of using mono- and diglyceride in the fat phase, there is no restriction on the physical properties of the mono- and diglyceride because they can be dissolved into fat. However, in case of starch-containing food, it is desirable to use mono- and diglyceride in the aqueous phase in order to obtain a starch-complexing improvement effect.

In these circumstances or where the emulsifier is mixed with the raw material in powdered form, physical appearance, physical and chemical properties and surface condition have a significant bearing on this function.

Monoglyceride is known to be polymorphic and is classified according to sub-$\alpha$, $\alpha$, $\beta'$ and $\beta$-crystalline forms which are arranged in order of increasing melting points. The $\beta$-crystalline form is the most stable thermodynamically and monoglyceride has always been marketed in the $\beta$-crystalline form.

The reason why the $\alpha$-crystalline form is more effective in the aqueous phase can be assumed to be because of a different in hydrophilicity. As a means of obtaining the $\alpha$-crystalline form, there is a so-called conjoined crystal method employing the combined use of saturated fatty acid monoglyceride and fatty acid propylene-glycol ester (J. Am. Oil., Chem. 40,725, (1963)); or a method wherein a dispersion in water is formed at a temperature below the melting point of monoglyceride. However, each of these methods have disadvantages, such as a small content of monoglyceride, difficulty in temperature control or in preservation properties.

From these standpoints, it would be advantageous to obtain a monoglyceride having the stable $\beta$-crystalline form while, at the same time, exhibiting good functional properties. Various methods have been considered as means for improving the hydrophilic properties. In other to increase the surface area of crystals, there is a method whereby minute crystals were obtained by recrystallization using a solvent (Patent: TOKU-KOSHO No. 50-34613) and a method whereby an aqueous dispersion of the $\beta$-crystalline form was obtained by adding a stabilizer into a dispersion or a method whereby a dry powered monoglyceride was obtained by adding binders into a dispersion (Patent TOKU-KOSHO No. 44-26900).

Each of these methods have excellent improvement effects. However, with respect to obtaining powdered monoglyceride, the methods were disadvantageous because they tended to be expensive from the standpoint of production efficiency, and a product in paste form proved to be inferior in handling, preservation and stability. Therefore, the development of a more simplified process has long been desired for obtaining a powdered monoglyceride which is effective in the aqueous phase. As a result of intensive research work in consideration of these shortcomings, the present inventors discovered a novel emulsifier composition which provides good quality improvement effects to starch containing food, and which is easier to handle, less expensive, withstands longer preservation time and is stable.

DESCRIPTION OF THE INVENTION

The present invention relates to a novel emulsifier composition which is prepared by melt-mixing a composition consisting of 65 to 90 wt% of saturated fatty acid monoglyceride and 35 to 10 wt% of cis-type unsaturated fatty acid monoglyceride, said composition having an iodine value of 10 to 40, with less than 10 wt% of one or more monoglyceride selected from diacetyltartaric acid esters of monoglyceride, mixed tartaric and acetic acid esters of monoglyceride, tartaric acid esters of monoglyceride, and citric acid esters of monoglyceride, and powdering the resultant mixture.

According to the present invention, the monoglyceride composition contains a saturated fatty acid having 12 to 22 carbon atoms or a cis-type unsaturated fatty acid having 16 to 22 carbon atoms. It can be prepared either by using a raw material of oil and fat that meets the range specified in this invention, or by using two or more different kinds of fatty acid monoglyceride.

When fatty acid monoglyceride is solidified by cooling, it forms the stable $\beta$-crystalline form after undergoing successive crystal formation, from each of sub-$\alpha$, $\alpha$ and $\beta'$ forms. But as the transition time becomes longer, the crystals thus obtained become coarser. Therefore, it is necessary to finish the transition as rapidly as possible in order to obtain minutely sized crystals in order to meet the purpose of the invention. The most effective method is to use solvent. The use of a solvent such as water or alcohol had already been proposed and reduced to practice at present.

However, as indicated earlier, problems lay in handling and preservation stability.

The inventors discovered that, from these standpoints, monoglyceride having unsaturated fatty acids with cis coordination in its double bond position suited the purpose of the invention.

Depending on the types of fatty acids, fatty acid monoglyceride has different polymorphic melting points. But, for a difference in number of carbon atoms within 4, it forms a solid solution. Therefore, it can be handled behaviorally as one fatty acid monoglyceride. ("Yukagaku" (Journal of the Japan Oil Chemists' Society), 28, No. 2, 100 (1979)).

As the result of research with a differential scanning calorimeter and X-ray diffractometer, the present inventors found that a saturated fatty acid monoglyceride and cis-type unsaturated fatty acid monoglyceride do not form a solid solution if the saturated fatty acid monoglyceride is of $\beta'$ of $\beta$-crystalline form. The present invention is based on these findings.

When a melt-mixture composed of a saturated fatty acid monoglyceride and a cis-type unsaturated fatty acid monoglyceride is cooled and solidified, the saturated fatty acid monoglyceride crystallizes in a heterogenous form in the cis-type unsaturated fatty acid monoglyceride, if the saturated fatty acid monoglyceride accounts for a minor portion. On the other hand, if the saturated fatty acid monoglyceride accounts for a major portion, the cis-type unsaturated fatty acid monoglyceride is immobilized in a thin film form in the fine crystal structure of the saturated fatty acid monoglyceride.

Among the compositions disclosed in the above-described invention, fatty acid monoglyceride, which is composed of cis-type unsaturated fatty acids is, on one hand, a good solvent and is low in compatibility with saturated fatty acid monoglyceride. On the other hand, it is largely hydrophilic even at a low temperature. Therefore, among saturated fatty acid monoglyceride, cis-type unsaturated fatty acid monoglyceride, when added with water, serves as a disintegrator and disperses saturated fatty acid monoglyceride in the aqueous phase. Monoglyceride which is composed of trans-type unsaturated fatty acids has a straight chain structure and a high melting point and is largely compatible with saturated fatty acid monoglyceride and is believed to form a condition which is close to the solid solution state. Therefore, this cannot be treated in the same manner as that of the cis-type.

On the one hand, both trans-type unsaturated fatty acid monoglyceride and cis-type unsaturated fatty acid monoglyceride pertain to the same unsaturated fatty acid series, and therefore they are presumed to have high compatibility with each other. If this presumption comes into being, a ternary mixture of saturated fatty acid monoglyceride, trans-type unsaturated fatty acid monoglyceride and cis-type unsaturated fatty acid monoglyceride is considered to form a solid solution at the time of cooling, depending on the ratio of mixing.

The unsaturated fatty acid monoglyceride in this invention is to be limited to cis-type, but not to perfect cis-type. In other words, although animal or vegetable oil which exists in nature and is not subjected to hydrogenation sometimes contains several percentages of trans-type unsaturated fatty acid moiety as its fatty acid, unsaturated fatty acid moiety of this oil can be deemed to be substantially cis-type unsaturated fatty acid. Also, in the case of a fatty acid having two or more than two double bonds in one molecule thereof, the case of at least one double bond being cis-type should be included in the scope of this invention.

Thus, there is prepared the basic constituent—a composition consisting of 65 to 90 wt% of saturated fatty acid monoglyceride and 35 to 10 wt% of cis-type unsaturated fatty acid monoglyceride, said composition having an iodine value of 10 to 40—of the powdery emulsifier composition of this invention which effectively forms a complex with starch.

If the amount of cis-type unsaturated fatty acid monoglyceride is less than 10% and the iodine value is less than 10, the expected results are not obtained. Likewise, if the amount is more than 35% and the iodine value is more than 40, the complex-forming ability with starch is deteriorated and, at the same time, it is difficult to obtain the composition in powdered form. From the standpoint of complex-forming ability with starch, it is more advantageous to have as high a content of saturated fatty acid monoglyceride as possible in the composition for the improvement of functional properties.

The present inventors studied the method for improving hydrophilicity of the above-mentioned monoglyceride composition and for improving its ability to form a complex with starch. As the result, the present inventors proposed already (1) an improvement accomplished by tempering the powdered monoglyceride composition at a temperaure higher than 45° C., (2) an improvement accomplished by mixing the monoglyceride composition with at least one of alcohols, organic acids, lecithins, and stearyl lactylates in an amount less than 5%, (3) and an improvement of powder quality by adding oil and fat having a melting point higher than 45° C. (U.S. Pat. No. 4,315,041 & U.S. Pat. No. 4,363,826). These methods are effective but are not completely satisfactory in the process and performance.

In order to overcome these disadvantages, the present inventors carried out a series of researches which led to the findings that an improvement can be effectively achieved by a combined use of the fatty acid monoglyceride composition with less than 10 wt% of one or more monoglycerides selected from diacetyltartaric acid esters of monoglyceride, mixed tartaric and acetic acid esters of monoglyceride, tartaric acid esters of monoglyceride, and citric acid esters of monoglyceride (which are abbreviated to as "polybasic acid esters of monoglycerides" collectively hereinafter). If the amount of polybasic acid esters of monoglycerides is more than 10 wt%, the resulting emulsifier composition is improved seemingly in dispersion into an aqueous phase, but an unfavourable result is produced because the fatty acid monoglyceride having the ability to form a complex with starch decreases in quantity. Thus, the polybasic acid esters of monoglycerides should preferably be used in an amount of 2 to 7 wt%.

It is known that these polybasic acid esters of monoglycerides are commonly used as a food emulsifier in the U.S. and European countries. They have a common characteristic that they have a considerable amount of carboxylic acid residues. The fatty acid constituting the monoglyceride may be a saturated or unsaturated fatty acid having 8 to 22 carbon atoms, or a mixture thereof. The preferred polybasic acid esters of monoglycerides is one in which unsaturated fatty acids account for a major portion in the constituent fatty acids. This, however, does not restrict the scope of this invention.

The polybasic acid esters of monoglycerides are characteristic in that they contain carboxylic acid residues, they function as an ionic surface active agent when dispersed in an aquous phase, and they expand the micell when used in combination with an nonionic surface active agent.

A mixture of saturated fatty acid monoglyceride, cis-type unsaturated fatty acid monoglyceride, and polybasic acid esters of monoglycerides sometimes behaves partially as a solid solution. However, the composition within range of this invention does not form a solid solution, but has a characteristic that the cis-type unsaturated fatty acid monoglyceride behaves independently. In other words, the cis-type unsaturated fatty acid monoglycerides, even in the three component composition, keeps its character for the two component composition with saturated fatty acid monoglyceride.

When the powdered emulsifier composition of this invention is added to water, the polybasic acid esters of monoglycerides dissolved in the cis-type unsaturated fatty acid monoglyceride promotes hydrophilicity owing to its high affinity for water and also promotes swelling of the cis-type unsaturated fatty acid monoglyceride owing to its ability to expand the micell. Presumably, this is the mechanism that improves disintegrability, size reduction of saturated fatty acid monoglyceride crystals, and apparent dispersibility.

Owing to the improvement of performance accomplished by diacetyltartaric acid esters of monoglyceride, mixed tartaric and acetic acid esters of monoglyceride, tartaric acid esters of monoglyceride, or citric acid esters of monoglyceride, the composition of this invention does not necessarily require tempering after powdering, and the quality of the powder is improved because of the absence of tempering steps. In addition, the polybasic acid esters of monoglycerides helps the cis-type unsaturated fatty acid monoglyceride to hydrate and swell, and therefore, it is possible to decrease the content of the cis-type unsaturated fatty acid monoglyceride in the emulsifier composition, and it is possible to increase the content of the saturated fatty acid monoglyceride having the ability to form a complex with starch.

There is no limitation in the method of powdering in this invention, but a method of heat-melting the emulsifier composition and thereafter powdering through process of spray cooling is effective. The particle size of the powder has preferably a distribution of particle size in which particles of about 42–80 mesh correspond to the medium particle size. If the particle size thereof becomes coarse, the function of the powder is lowered, and if the particle size thereof becomes fine, the handling of the powder is deteriorated. However, some variation in the particle size is permitted, because the degree of lowering of the function and handling are comparatively small.

It has been determined that the crystalline forms of saturated fatty acid monoglyceride in the emulsifier composition obtained by this invention are $\beta$-type crystalline form for the most part and $\beta'$-type crystalline form for a minor part using X-ray diffraction analysis, differential thermal analysis, and differential scanning calorimeter. Accordingly, it can be understood that the emulsifier composition of this invention is excellent in the function and stability thereof.

The efficiency of the emulsifier composition by this invention can be evaluated by Blue Value (hereinafter abbreviated "BV"), because its efficiency appears mainly by forming a complex with starch. BV is based on utilizing iodine-starch reaction, and when starch forms a complex with fatty acid monoglyceride, coloring of starch by iodine is depressed and therefore the degree of formation of the complex, i.e., the efficiency of the emulsifier composition can be evaluated by measureing its absorbance.

Accordingly, it is shown that the lower the value of BV, the larger the amount of formation of the complex, and the better the efficiency of the emulsifier. For practical use, a value of BV of less than 0.300 is adequate.

In case of using the emulsifier composition of this invention, it is sufficient to mix it with powder which is a raw material of foods or water, and therefore, it excels in the handling thereof.

The emulsifier composition disclosed under this invention is capable of improving the quality of starch containing food by being added directly to the starch containing food or to the mix. This composition exerts excellent quality improvement effect in making bread, pastries, pan cake, noodles, cookies, food made from fish and livestock and the said mix. Since it exerts excellent quality improvement effects by mixing with water, comparable effects were recognized in fat and water-based foods and in protein-containing foods.

The composition is not limited to use in the aqueous phase, but can also be used in a fat phase.

The invention is now described with reference to the following examples.

EXAMPLE 1

Various combinations of saturated fatty acid monoglyceride, cis-type unsaturated fatty acid monoglyceride, and polybasic acid esters of monoglycerides were prepared from the following monoglycerides according to the compositions as shown in Table 1.

Distilled monoglyceride of fatty acid of fully hardened soybean oil (trade name Emulsy MH, a product of Riken Vitamin Co., Ltd., acid value: 1.0, iodine value: 0.6), Distilled monoglyceride of fatty acid of safflower oil (trade name Emulsy MU, a product of Riken Vitamin Co., Ltd., acid value: 2.1, iodine value: 115.2), Monoglyceride of diacetyl tartaric acid and purified beef tallow fatty acid (abbreviated as TEM-1, acid value: 99, iodine value: 23), Monoglyceride of diacetyltartaric acid and fully hardened soybean oil fatty acid (abbreviated as TEM-2, acid value: 97, iodine value: 0.8), Monoglyceride of acetic acid/tartaric acid and cotton seed oil fatty acid (abbreviated as ATM, acid value: 88, iodine value: 54), Monoglyceride of tartaric acid and hardened beef tallow fatty acid (abbreviated as TM, acid value: 53, iodine value: 0.6), and Monoglyceride of citric acid and olive oil fatty acid (abbreviated as CM, acid value: 92, iodine value: 61).

Each composition was melted uniformly and spray cooled to obtain powder having a medium particle size of 60 mesh. Each sample was allowed to stand at room temperature for 7 days and 180 days and the dispresibility into water and the BV value were measured. The results are shown in Table 2.

Method for measuring the apparent dispersiblity:

Place 100 ml of water (20° C.) in a 100-ml glass beaker with a fine white line attached to one side. Add 2 g of sample powder to this beaker. Stir the content with a magnetic stirrer for 30 seconds and allow the content to stand. Measure the time (second) required for the white line to become visible to the naked eye from the opposite side. The longer the time, the better the apparent dispersibility due to sustained turbidity Blue Value (BV value) test method:

Add 0.02 g of sample to 40 ml of 0.5% gelatinized starch solution at 32° C. After shaking, allow the solution to stand. Take 2.5 ml, and add 1 ml of 0.02N iodine-potassium iodine solution with shaking. Dilute to 100 ml and filter. Measure the absorbance at wave-length 660 nm. The temperature of solution keeps at 32° C. during operation.

TABLE 1

| Fatty acid composition of monoglyceride, iodine value and addition of polybasic acid esters of monoglycerides. | | | | |
|---|---|---|---|---|
| Fatty acid composition and iodine value of monoglyceride | | | Polybasic acid esters of monoglycerides | |
| Experiment No. | Saturated fatty acid | Cis-type unsaturated fatty acid | iodine value | Type | Blending amount (%) |
| 1 | 95 | 5 | 6.5 | — | 0 |
| 2 | 95 | 5 | 6.5 | TEM-1 | 5 |
| 3 | 95 | 5 | 6.5 | TEM-1 | 10 |
| 4 | 95 | 5 | 6.5 | TEM-1 | 15 |
| 5 | 90 | 10 | 13.0 | — | 0 |

TABLE 1-continued

Fatty acid composition of monoglyceride, iodine value and addition of polybasic acid esters of monoglycerides.

| Experiment No. | Fatty acid composition and iodine value of monoglyceride | | | Polybasic acid esters of monoglycerides | |
|---|---|---|---|---|---|
| | Saturated fatty acid | Cis-type unsaturated fatty acid | iodine value | Type | Blending amount (%) |
| 6 | 90 | 10 | 13.0 | TEM-1 | 5 |
| 7 | 90 | 10 | 13.0 | TEM-1 | 10 |
| 8 | 90 | 10 | 13.0 | TEM-1 | 15 |
| 9 | 90 | 10 | 13.0 | TEM-1 | 20 |
| 10 | 90 | 10 | 13.0 | TEM-2 | 5 |
| 11 | 90 | 10 | 13.0 | ATM | 5 |
| 12 | 90 | 10 | 13.0 | TM | 5 |
| 13 | 90 | 10 | 13.0 | CM | 5 |
| 14 | 70 | 30 | 39.0 | — | 0 |
| 15 | 70 | 30 | 39.0 | TEM-1 | 2.5 |
| 16 | 70 | 30 | 39.0 | TEM-2 | 2.5 |
| 17 | 70 | 30 | 39.0 | ATM | 2.5 |
| 18 | 70 | 30 | 39.0 | TM | 5 |
| 19 | 70 | 30 | 39.0 | CM | 2.5 |
| 20 | 65 | 35 | 45.5 | — | 0 |
| 21 | 65 | 35 | 45.5 | TEM-2 | 2.5 |
| 22 | 65 | 35 | 45.5 | TE | 5 |

Note to Table 1
Composition of fatty acid (%): $C_{16}$ $C_{18}$ cis-$C_{18'}$ cis-$C_{18''}$
Distilled monoglyceride of fully hardened soybean oil fatty acid: 11, 89
Distilled monoglyceride of safflower oil fatty acid: 8, 3, 15, 74

TABLE 2

Change with Time of Apparent Dispersibility and BV value

| Experiment No. | | Apparent Dispersibility (seconds) | | BV values | |
|---|---|---|---|---|---|
| | | 7 days | 180 days | 7 days | 180 days |
| 1 | Comp. Ex. | 15 | 20 | 0.470 | 0.420 |
| 2 | Comp. Ex. | 30 | 35 | 0.375 | 0.370 |
| 3 | Comp. Ex. | 65 | 60 | 0.370 | 0.360 |
| 4 | Comp. Ex. | 70 | 60 | 0.400 | 0.400 |
| 5 | Comp. Ex. | 25 | 25 | 0.395 | 0.380 |
| 6 | Example | 300 up | 300 up | 0.100 | 0.110 |
| 7 | Example | 300 up | 300 up | 0.130 | 0.130 |
| 8 | Comp. Ex. | 300 up | 300 up | 0.280 | 0.280 |
| 9 | Comp. Ex. | 300 up | 300 up | 0.315 | 0.300 |
| 10 | Example | 300 up | 300 up | 0.175 | 0.160 |
| 11 | Example | 300 up | 300 up | 0.205 | 0.210 |
| 12 | Example | 300 up | 300 up | 0.220 | 0.225 |
| 13 | Example | 300 up | 300 up | 0.200 | 0.210 |
| 14 | Comp. Ex. | 40 | 35 | 0.370 | 0.365 |
| 15 | Example | 300 up | 300 up | 0.115 | 0.105 |
| 16 | Example | 300 up | 300 up | 0.140 | 0.140 |
| 17 | Example | 300 up | 300 up | 0.185 | 0.175 |
| 18 | Example | 300 up | 300 up | 0.200 | 0.200 |
| 19 | Example | 300 up | 300 up | 0.190 | 0.195 |
| 20 | Comp. Ex. | Good powder was not obtained. | | | |
| 21 | Comp. Ex. | Good powder was not obtained. | | | |
| 22 | Comp. Ex. | Good powder was not obtained. | | | |
| *23(5') | Comp. Ex. | 80 | 90 | 0.250 | 0.265 |
| *24(14') | Comp. Ex. | 85 | 85 | 0.085 | 0.100 |
| 25 | Blank | — | — | 0.750 | 0.780 |

Note to Table 2
*In Experiments Nos. 23 and 24, the products in Experiment Nos. 5 and 14, respectively, were powdered by spray cooling and then tempering at 50° C. for 2 hours and allowed to stand at room temperature.

The above results indicate that the emulsifier compositions of this invention are superior in dispersibility into water and BV value. Products in Comparative Examples were poor in dispersibility or BV value or both. In Experiment Nos. 20 to 22, the resulting products are excessively high in iodine value and good powder is not obtained.

EXAMPLE 2

Various combinations of saturated fatty acid monoglyceride, cis-type unsaturated fatty acid monoglyceride, and polybasic acid esters of monoglycerides were prepared from the following monoglycerides according to the compositions as shown in Table 3.

Distilled monoglyceride of fatty acid of fully hardnened palm oil (acid value: 1.1, iodine value: 0.8), Distilled monoglyceride of fatty acid of oleic safflower oil (acid value: 1.8, iodine value: 76.2), and polybasic acid esters of monoglycerides TEM-1 and CM (used in Example 1). Each sample was allowed to stand at room temperature for 7 days and 180 days and the dispersibility into water and the BV value were measured. The results are shown in Table 4.

These results indicate that the emulsifier compositions of Examples are superior to those in Comparative Examples. The product in Experiment No. 36 was poor in powder state.

TABLE 3

Fatty acid composition of monoglyceride, iodine value and addition of polybasic acid esters of monoglycerides.

| Experiment No. | Fatty acid composition and iodine value of monoglyceride | | | Polybasic acid esters of monoglycerides | |
|---|---|---|---|---|---|
| | Saturated fatty acid | Cis-type unsaturated fatty acid | Iodine Value | Type | Blending amount (%) |
| 26 | 90 | 10 | 7.7 | — | 0 |
| 27 | 90 | 10 | 7.7 | TEM-1 | 2.5 |
| 28 | 90 | 10 | 7.7 | TEM-1 | 5 |
| 29 | 90 | 10 | 7.7 | CM | 2.5 |
| 30 | 90 | 10 | 7.7 | CM | 5 |
| 31 | 65 | 35 | 27.0 | — | 0 |
| 32 | 65 | 35 | 27.0 | TEM-1 | 1 |
| 33 | 65 | 35 | 27.0 | TEM-1 | 5 |
| 34 | 65 | 35 | 27.0 | CM | 2.5 |
| 35 | 65 | 35 | 27.0 | CM | 5 |
| 36 | 60 | 40 | 30.8 | — | 0 |
| 37 | Blank | | — | — | — |

Note to Table 3:
Composition of fatty acid (%): $C_{16}$ $C_{18}$ Cis-$C_{18'}$ Cis-$C_{18''}$
Distilled monoglyceride of fully hardened palm oil fatty acid: 45, 55
Distilled monoglyceride of oleic safflower oil fatty acid: 5, 2, 77, 16

TABLE 4

Change with Time of Apparent Dispersibility and BV Values

| Experiment No. | | Apparent Dispersibility (seconds) | | BV values | |
|---|---|---|---|---|---|
| | | 7 days | 180 days | 7 days | 180 days |
| 26 | Comp. Ex. | 20 | 20 | 0.475 | 0.460 |
| 27 | Comp. Ex. | 30 | 35 | 0.370 | 0.375 |
| 28 | Comp. Ex. | 40 | 45 | 0.300 | 0.295 |
| 29 | Comp. Ex. | 25 | 20 | 0.405 | 0.400 |
| 30 | Comp. Ex. | 25 | 30 | 0.365 | 0.375 |
| 31 | Comp. Ex. | 45 | 60 | 0.365 | 0.365 |
| 32 | Example | 180 | 230 | 0.205 | 0.225 |
| 33 | Example | 300 up | 300 up | 0.090 | 0.105 |
| 34 | Example | 300 up | 300 up | 0.210 | 0.205 |
| 35 | Example | 300 up | 300 up | 0.165 | 0.150 |
| 36 | Comp. Ex. | Powder in poor state | | — | — |
| 37 | Blank | — | — | 0.730 | 0.720 |

EXAMPLE 3

Bread making test was conducted using the samples obtained in Experiment Nos. 5, 6, 8, 12, 15 and 23 in Example 1 and Experiment Nos. 28, 31 and 32 in Example 2. The resulting bread samples were evaluated for the dough test and the aging retardation effects. The results are shown in Table 5.

Bread Making Test Method

Bread samples were prepared by sponge-doubg method according to the AACC method, and the emulsifier composition was added in an amount of 0.4% for wheat flour. After baking, the bread samples were allowed to stand at 20° C. and the degree of aging retardation was measured.

Aging Retardation Test Methods 5 test specimens of 5 cm square and 1.5 cm in thickness were taken from the central portion of the bread and were measured by a Texturometer (manufactured by General Foods) (plunger: 5 cm in diameter, 10 flat dish, clearance: 5 mm, low speed electric voltage: 2 V).

Dough Test was Evaluated by Sensory Test.

The test results indicate that the compositions of this invention are superior in dough test and aging retardation effects.

TABLE 5

| Experiment No. | Test specimens | Bread Making Test Dough Test | Aging retardation effect kg/10 mm 1st day | 2nd day | 3rd day |
|---|---|---|---|---|---|
| 38 | No. 5 Comp. Ex. | Poor | 0.94 | 1.45 | 1.65 |
| 39 | No. 6 Example | Good | 0.78 | 1.03 | 1.22 |
| 40 | No. 8 Comp. Ex. | Fair | 0.81 | 1.16 | 1.43 |
| Ex. 1 | | | | | |
| 41 | No. 12 Example | Good | 0.78 | 0.98 | 1.20 |
| 42 | No. 15 Example | Good | 0.76 | 0.96 | 1.15 |
| 43 | No. 23 Comp. Ex. | Good | 0.75 | 0.97 | 1.25 |
| 44 | No. 28 Comp. Ex. | Poor | 0.87 | 1.32 | 1.60 |
| 45 | No. 31 Comp. Ex. | Poor | 0.85 | 1.30 | 1.40 |
| Ex. 2 | | | | | |
| 46 | No. 32 Example | Fair | 0.82 | 1.17 | 1.25 |
| 47 | Blank | Bad | 1.12 | 1.65 | 1.80 |

What is claimed is:

1. A powdered emulsifier composition which is prepared by meltmixing a monoglyceride composition consisting of 65 to 90 wt% of a saturated fatty acid monoglyceride and 35 to 10 wt% of a cis-type unsaturated fatty acid monoglyceride, said composition having an iodine value of 10 to 40, with 1 to 10 wt% of one or more polybasic acid esters of monoglycerides selected from diacetyltartaric acid esters of monoglyceride, mixed tartaric and acetic acid esters of monoglyceride, tartaric acid esters of monoglyceride and citric acid esters of monoglyceride, and powdering the resultant mixture.

2. The emulsifier composition according to claim 1 wherein the polybasic acid esters of monoglycerides are melt-mixed in an amount of 2 to 7 wt%.

3. A method of improving the quality of starch-containing foods which comprises adding directly to the food or to a preparative component thereof an effective amount of emulsifier composition of claim 1.

* * * * *